US011120509B2

(12) United States Patent
Gray et al.

(10) Patent No.: US 11,120,509 B2
(45) Date of Patent: *Sep. 14, 2021

(54) PREDICTIVE MODEL SEGMENTATION PLATFORM

(71) Applicant: Hartford Fire Insurance Company, Hartford, CT (US)

(72) Inventors: Willie F. Gray, North Granby, CT (US); Amanda Sue Harper, Atlanta, GA (US); Allison M. Scaia, St. Louis, MO (US); Lisa Workin, Eagan, MN (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/537,880

(22) Filed: Aug. 12, 2019

(65) Prior Publication Data

US 2019/0362434 A1 Nov. 28, 2019

Related U.S. Application Data

(63) Continuation of application No. 15/294,038, filed on Oct. 14, 2016, now Pat. No. 10,380,698, which is a continuation of application No. 13/906,836, filed on May 31, 2013, now abandoned.

(51) Int. Cl.
| G06Q 40/00 | (2012.01) |
| G06Q 40/08 | (2012.01) |
| G06N 20/00 | (2019.01) |
| G06F 16/22 | (2019.01) |

(52) U.S. Cl.
CPC ............. *G06Q 40/08* (2013.01); *G06F 16/22* (2019.01); *G06N 20/00* (2019.01)

(58) Field of Classification Search
CPC .......................... G06Q 40/00; G06Q 10/06375
USPC .............................................................. 705/4
See application file for complete search history.

(56) References Cited

U.S. PATENT DOCUMENTS

| 8,046,281 | B1 | 10/2011 | Urrutia |
| 8,126,742 | B2 | 2/2012 | Bond, Jr. et al. |
| 8,332,234 | B1 | 12/2012 | Armentano et al. |
| 8,347,295 | B1 | 1/2013 | Robertson et al. |
| 8,401,896 | B2 | 3/2013 | Wargin et al. |
| 8,775,216 | B1 | 7/2014 | Amick et al. |

(Continued)

*Primary Examiner* — Ojo O Oyebisi
(74) *Attorney, Agent, or Firm* — Howard IP Law Group, PC

(57) ABSTRACT

A segmentation platform is interposed between an intake server and remote user-accessible computers. The segmentation platform includes a model training computer processor configured to generate a predictive model for determining a segment corresponding to received data sets based upon claim segment rules and historical data sets stored in data storage devices. The segmentation platform may be configured to dynamically update workload data corresponding to a plurality of users, and responsive to that updating and based upon application of the predictive model, segment the received current data sets and transmit electronic claim files to respective remote user-accessible computing devices. The predictive model is continually adapted through activation of the model training component to update the predictive model with new current claim data sets.

16 Claims, 12 Drawing Sheets

(56) References Cited

U.S. PATENT DOCUMENTS

| | | | |
|---|---|---|---|
| 8,903,182 B1 * | 12/2014 | Duerig | G06F 16/583 382/224 |
| 2004/0267591 A1 | 12/2004 | Hedlund et al. | |
| 2006/0085230 A1 | 4/2006 | Brill et al. | |
| 2009/0132331 A1 | 5/2009 | Cartledge et al. | |

* cited by examiner

| CLAIM IDENTIFIER 502 | DISABILITY DESCRIPTION 504 | DATE OF BIRTH 506 | DETERMINED SEGMENT 508 | ASSIGNED CLAIM HANDLER IDENTIFIER 510 |
| --- | --- | --- | --- | --- |
| C_100001 | PREGNANCY | 7/15/1990 | ONE | H_101 |
| C_100002 | BACK INJURY | 4/21/1985 | TWO | H_102 |
| C_100003 | CANCER | 11/30/1965 | THREE | H_103 |
| C_100004 | BACK INJURY | 1/14/1977 | TWO | H_102 |
| C_100005 | PREGNANCY | 7/15/1975 | TWO | H_102 |

*FIG. 5*

PREDICTIVE MODEL SEGMENTATION PLATFORM

CROSS REFERENCE TO RELATED APPLICATIONS

This application is a continuation application of co-pending U.S. patent application Ser. No. 15/294,038 entitled Segmentation Platform, filed Oct. 14, 2016, which is a continuation of U.S. patent application Ser. No. 13/906,836, filed May 31, 2013, now abandoned, the entire contents of each of which is herein incorporated by reference for all purposes.

FIELD

The present invention relates to computer systems and more particularly to computer systems that provide segmentation and routing.

BACKGROUND

An insurer may provide payments when claims are made in connection with a disability insurance policy. For example, an employee who becomes too ill to work might receive payments associated with a long term disability insurance policy purchased by his or her employer. Note that payments might continue until the employee is able to return to work. The insurer may assign a claim handler to communicate with the employee, the employer, and/or medical service providers to facilitate the employee's return to the workplace. Moreover, different claim handlers may have different abilities and/or different workloads.

In one approach, newly received disability insurance claims might be assigned to claim handlers in a random or round robin manner. This, however, might lead to one claim handler having a significantly more complex workload as compared to another claim handler. To avoid such a result, particular types of disability insurance claims might be more effectively assigned to particular claim handlers. For example, a relatively complicated insurance claim might be more efficiently processed by a claim handler who handles a relatively small number of insurance claims and/or is especially skilled when it comes to handling these types of insurance claims.

Manually determining which claim handler should be assigned to each individual insurance claim, however, can be time consuming task, especially when there are a substantial number of claims to be analyzed. For example, an insurer might receive tens of thousands of new long term disability insurance claims each year (which might represent a billion dollars of potential liability). It would therefore be desirable to provide systems and methods to facilitate the assignment of disability insurance claims to claim handlers, in an automated, efficient, and accurate manner.

SUMMARY

According to some embodiments, systems, methods, apparatus, computer program code and means may facilitate the assignment of disability insurance claims to claim handlers. In some embodiments, a triage platform may receive data indicative of a disability insurance claim submitted in connection with a disability insurance policy, including at least one claim characteristic. The triage platform may determine, based on the claim characteristic, a claim segment to be associated with the disability insurance claim. A claim handler may be assigned to the disability insurance claim in accordance with the determined claim segment. Information about the disability insurance claim may then be automatically routed to the assigned claim handler.

Some embodiments provide: means for receiving, at a triage platform, data indicative of a disability insurance claim submitted in connection with a disability insurance policy, including at least one claim characteristic; means for determining, by a computer processor of the triage platform based on the claim characteristic, a claim segment to be associated with the disability insurance claim; means for assigning a claim handler to the disability insurance claim in accordance with the determined claim segment; and means for automatically routing information about the disability insurance claim to the assigned claim handler.

A technical effect of some embodiments of the invention is an improved and computerized method to facilitate the assignment of disability insurance claims to claim handlers. With these and other advantages and features that will become hereinafter apparent, a more complete understanding of the nature of the invention can be obtained by referring to the following detailed description and to the drawings appended hereto.

According to some embodiments, a triage platform may receive data indicative of a disability insurance claim submitted in connection with a disability insurance policy, including at least one claim characteristic. The triage platform may determine, based on the claim characteristic, a claim segment to be associated with the disability insurance claim. A claim handler may be assigned to the disability insurance claim in accordance with the determined claim segment. Information about the disability insurance claim may then be automatically routed to the assigned claim handler.

BRIEF DESCRIPTION OF THE DRAWINGS

FIG. 5 is a tabular portion of a long term disability insurance claim database according to some embodiments.

DETAILED DESCRIPTION

An insurer may provide payments when claims are made in connection with a "disability insurance" policy. As used herein, the phrase "disability insurance" may refer to a form of long term disability insurance that insures an employee's earned income against the risk that a disability will prevent him or her from performing core work functions. For example, the inability to lift heavy objects or maintain focus (as with a psychological disorder), an illness or other conditions may cause physical impairment and an inability to work. Insurance payments generally continue until the employee is able to return to work, and in many cases the insurer will assign a claim handler to communicate with the employee, the employer, and/or medical service providers to facilitate the employee's return to the workplace. Note that embodiments may also be associated with other types of disability insurance, including workers' compensation insurance, short term disability insurance, and/or flexible combinations of short and long term disability insurance.

Figure 1:
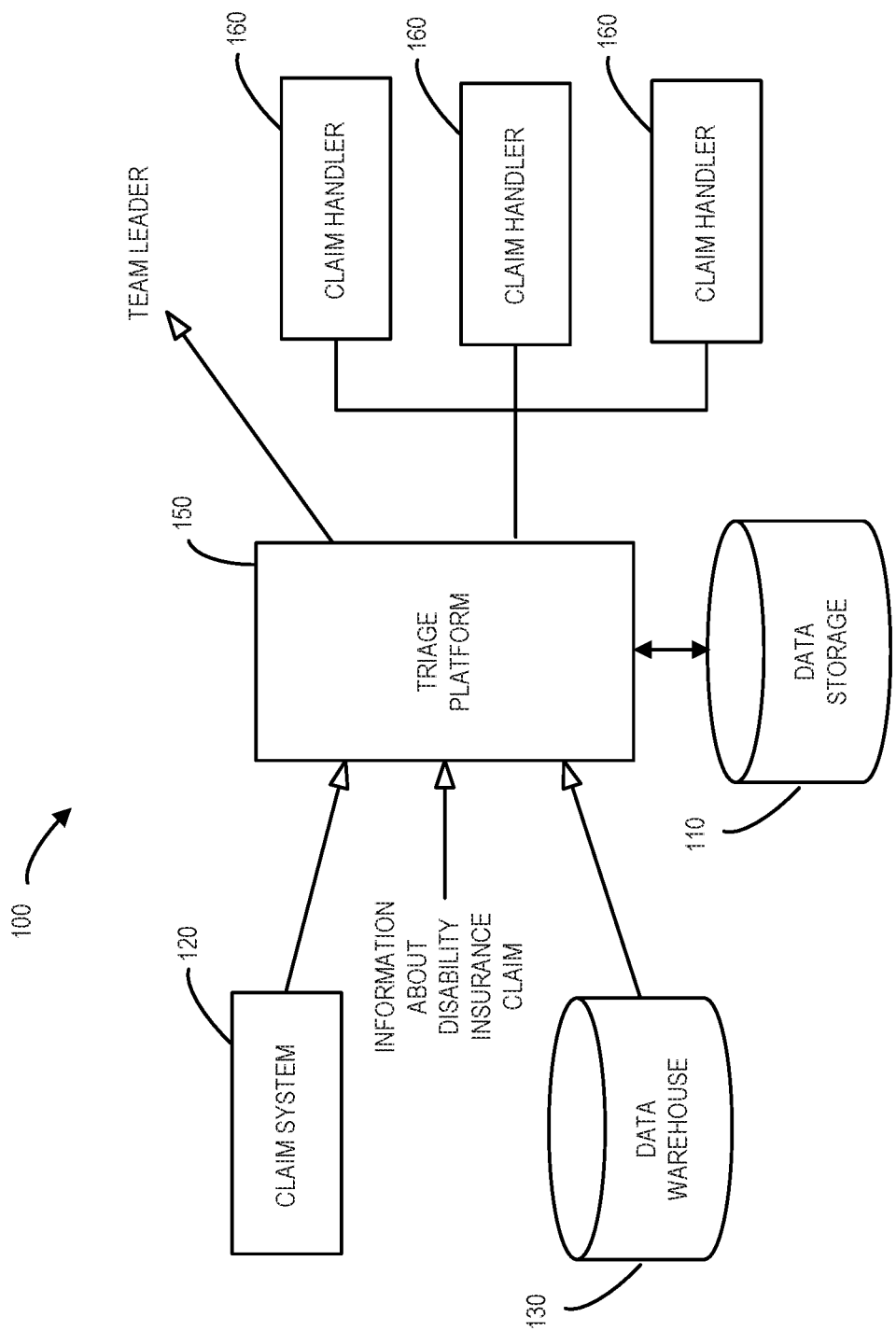
FIG. 1 is block diagram of a system according to some embodiments of the present invention.

In some cases, different claim handlers will have different abilities and/or different workloads. As a result, particular types of disability insurance claims might be more effectively assigned to particular claim handlers. Manually determining which claim handler should be assigned to each individual insurance claim, however, can be time consuming and difficult task, especially when there are a substantial number of claims to be analyzed. It would therefore be desirable to provide systems and methods to facilitate the assignment of disability insurance claims to claim handlers. FIG. 1 is block diagram of a system 100 according to some embodiments of the present invention. In particular, the system 100 includes a triage platform 150 that receives information about disability insurance claims (e.g., by receiving an electronic file from a team leader, an employer, an employee, an insurance agent, a medical service provider, or a data storage 110). According to some embodiments, incoming telephone calls and/or documents from a doctor may be used to create information in a claim system 120 which, in turn, can provide information to the triage platform 150. In other embodiments, the triage platform 150 may retrieve information from a data warehouse 130 (e.g., when the triage platform 150 is associated with a long term disability insurance system, some information may be copied from a short term disability system data warehouse). In other embodiments, some or all of the information about a disability claim may be received via an only claim submission process. The triage platform may, according to some embodiments, provide an automatic initial assessment of new insurance claim to determine an appropriate claim segment based on complexity and/or identify a particular claim handler 160 to process the insurance claim. According to some embodiments, recovery profile information may be generated and provided to claim handler. For example, historical information may be used to generate appropriate recovery profile information based on the specific facts of the insurance claim being processed.

The triage platform 150 might be, for example, associated with a Personal Computers (PC), laptop computer, an enterprise server, a server farm, and/or a database or similar storage devices. The triage platform 150 may, according to some embodiments, be associated with an insurance provider.

According to some embodiments, an "automated" triage platform 150 may facilitate the assignment of disability insurance claims to claim handlers 160. For example, the triage platform 150 may automatically output a recommended claim segment for a received insurance claim (e.g., to a team leader) which may then be used to facilitate assignment of a claim handler 160. As used herein, the term "automated" may refer to, for example, actions that can be performed with little (or no) intervention by a human.

As used herein, devices, including those associated with the triage platform 150 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The triage platform 150 may store information into and/or retrieve information from the data storage 110. The data storage 110 might be associated with, for example, a client, an employer, or insurance policy and might store data associated with past and current disability insurance claims. The data storage 110 may be locally stored or reside remote from the insurance claim triage platform 150. As will be described further below, the data storage 110 may be used by the triage platform 150 to generate predictive models. According to some embodiments, the triage platform 150 communicates a recommended claim segment, such as by transmitting an electronic file to a claim handler 160, a client device, an insurance agent or analyst platform, an email server, a workflow management system, etc. In other embodiments, the triage platform 150 might output a claim segment indication to a team leader who might select a claim handler based on that indication or override the indication based on other factor associated with the disability claim.

Although a single triage platform 150 is shown in FIG. 1, any number of such devices may be included. Moreover, various devices described herein might be combined according to embodiments of the present invention. For example, in some embodiments, the claim triage platform 150 and data storage 110 might be co-located and/or may comprise a single apparatus.

Figure 2:
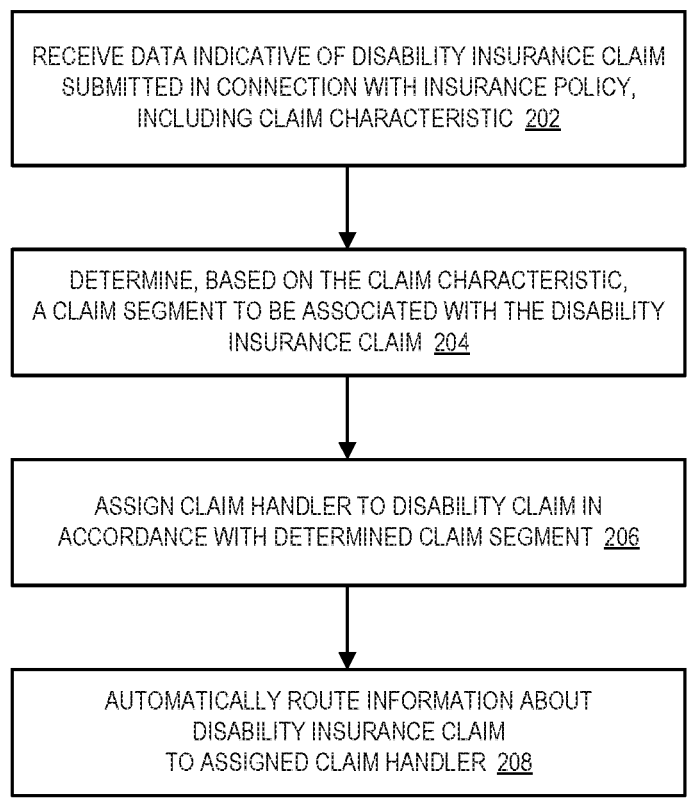
FIGS. 2 and 3 illustrate methods that might be performed in accordance with some embodiments.

FIG. 2 illustrates a method that might be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, data indicative of a disability insurance claim submitted in connection with a disability insurance policy may be received. The data indicative of the disability insurance claim might be received, for example, via a submitted paper claim or a telephone call center. The received data may include at least one claim "characteristic" associated with the insurance claim. Examples of claim characteristics include, without limitation, an employee's date of birth, a date of disability, a waiting period (e.g., how long a claimant might need to be unable to work before payments are provided), diagnosis information, a claimant salary, an own occupation period (e.g., after which an employee might return to a different type of job), a job type, a marriage status, a benefit percentage, claimant gender, and/or information from an attending physician.

At 204, a claim "segment" to be associated with the disability insurance claim may be determined. For example, potential claim segments might include a segment for higher complexity disability insurance claims and a segment for lower complexity disability insurance claims.

At 206, a claim handler is assigned to the disability insurance claim in accordance with the determined claim segment. Note that other information may also be considered when determining a claim segment and/or claim handler. For example, the language spoken by the claimant and/or the proficiency and/or specialized abilities of a claim handler might be taken into account. Information about the disability insurance claim may then be automatically routed to the assigned claim handler at 208. According to some embodiments, the system may further output an indication of the determined claim segment to a team leader, determine and output an indication of a diagnosis description for the disability insurance claim, and/or determine and outputting a recovery profile for the disability insurance claim. For example, the system may transmit, to the assigned claim handler, recovery profile comments generated based on historical results and the details regarding the claim being handled. Note that a plurality of recovery profiles might be provided, each associated with a different recovery period.

Figure 3:
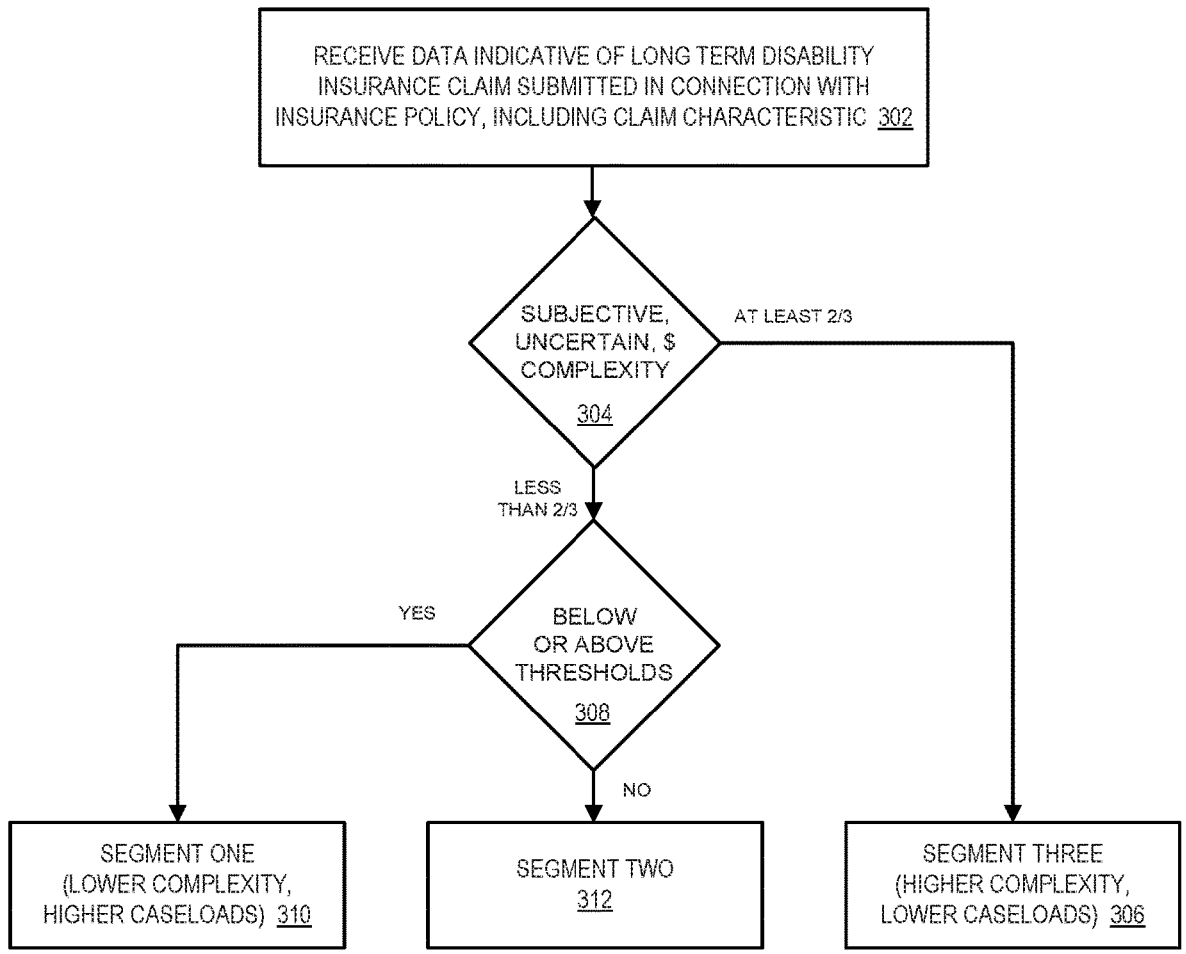

The disability insurance claim might be associated with a particular claim segment in accordance with any number of various business logic rules. For example, FIG. 3 illustrates one method that might be performed by some or all of the elements of the system 100 described with respect to FIG. 1 according to some embodiments of the present invention. In this example, the insurance policy is a long term disability insurance policy and three segments have been established:

Segment One: for claims which may require less intense intervention (which can be assigned to claim handlers with relatively heavy workloads);

Segment Two: for typical claims which may have a possible return to work in either the claimant's own occupation or an alternate occupation; and Segment Three: for claims which may have medical, occupational, and/or financial complexities which require more in-depth investigation (which should be assigned to claim handlers with relatively light workloads so they can devote more time to each individual insurance claim or to claim handlers who are skilled at handling complex claims).

At 302, data indicative of a long term disability insurance claim submitted in connection with a long term disability insurance policy may be received. At 304, the insurance claim is evaluated to determine if the claim meets at least two of the following three criteria: (1) is it a relatively subjective diagnosis (e.g. clinical depression, Lyme disease), (2) is there an "uncertain" recovery profile, and (3) is there a greater than average amount of financial complexity associated with the claim. If at least two of those criteria are present at 304, the insurance claim is associated with segment three at 306 (for higher complexity long term disability insurance claims).

If the insurance claim did not have at least two of the criteria at 304, it is determined at 308 whether or not the insurance claim's recovery profile satisfies either: (1) a likelihood of recovery above a pre-determined threshold value (e.g., a pregnant employee is very likely to return to work) or (2) a likelihood of recovery below a pre-determined threshold (e.g., an employee with late stage pancreatic cancer is very unlikely to return to work). If either of these conditions are true at 308, the insurance claim is associated with segment one at 310 (for lower complexity long term disability insurance claims), otherwise the insurance claim is associated with segment two at 312. The determined segment might then be output (e.g., to a team leader) and/or used to assign a claim handler to the insurance claim.

Figure 4:
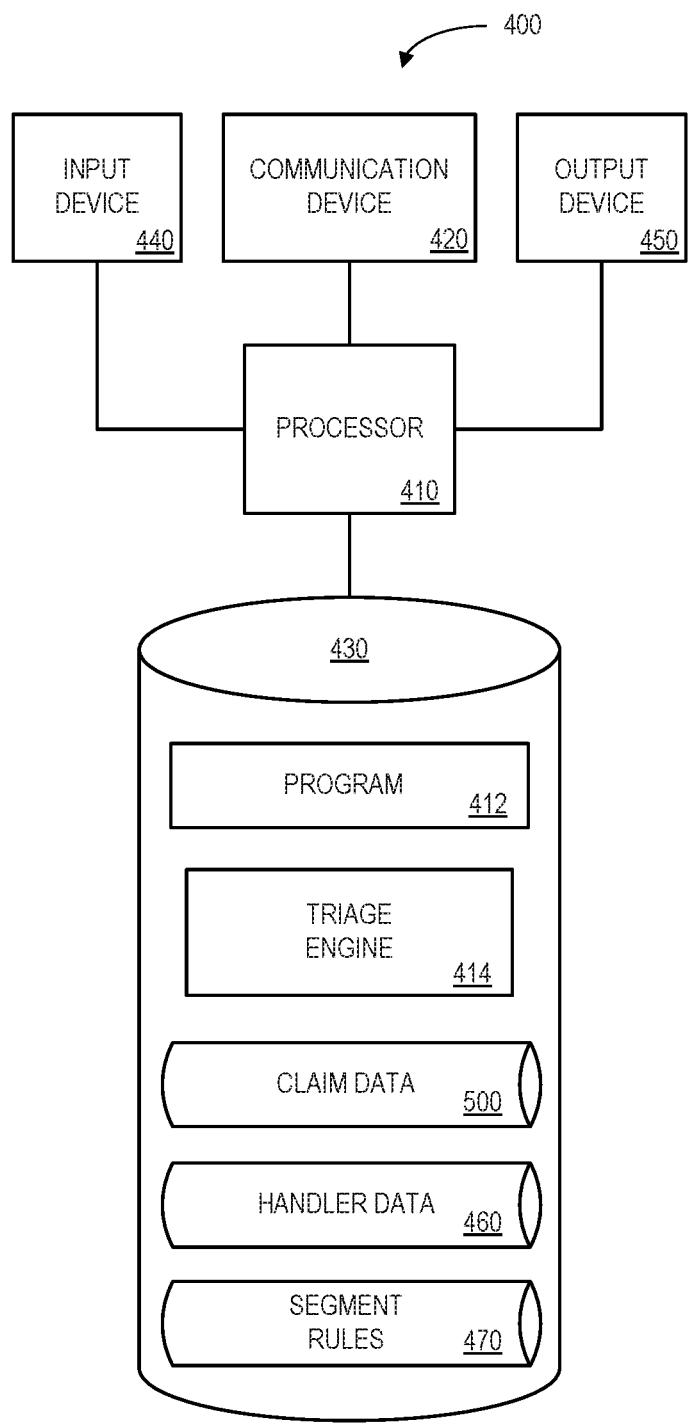
FIG. 4 is block diagram of a triage tool or platform according to some embodiments of the present invention.

The embodiments described herein may be implemented using any number of different hardware configurations. For example, FIG. 4 illustrates a triage platform 400 that may be, for example, associated with the system 100 of FIG. 1. The triage platform 400 comprises a processor 410, such as one or more commercially available Central Processing Units (CPUs) in the form of one-chip microprocessors, coupled to a communication device 420 configured to communicate via a communication network (not shown in FIG. 4). The communication device 420 may be used to communicate, for example, with one or more remote team leader and/or claim handler devices. The triage platform 400 further includes an input device 440 (e.g., a mouse and/or keyboard to enter information about an insurance claim and/or segmentation logic) and an output device 450 (e.g., to output a recommended segment and/or claim handler).

The processor 410 also communicates with a storage device 430. The storage device 430 may comprise any appropriate information storage device, including combinations of magnetic storage devices (e.g., a hard disk drive), optical storage devices, mobile telephones, and/or semiconductor memory devices. The storage device 430 stores a program 412 and/or a triage engine application 414 for controlling the processor 410. The processor 410 performs instructions of the programs 412, 414, and thereby operates in accordance with any of the embodiments described herein. For example, the processor 410 may receive data indicative of a long term disability insurance claim submitted in connection with a long term disability insurance policy, including at least one claim characteristic. The processor 410 may determine, based on the claim characteristic, a claim segment to be associated with the long term disability insurance claim. A claim handler may be assigned to the long term disability insurance claim by the processor 410 in accordance with the determined claim segment. Information about the long term disability insurance claim may then be automatically routed to the assigned claim handler by the processor 410.

The programs 412, 414 may be stored in a compressed, uncompiled and/or encrypted format. The programs 412, 414 may furthermore include other program elements, such as an operating system, a database management system, and/or device drivers used by the processor 410 to interface with peripheral devices.

As used herein, information may be "received" by or "transmitted" to, for example: (i) the triage platform 400 from another device; or (ii) a software application or module within the triage platform 400 from another software application, module, or any other source.

In some embodiments (such as shown in FIG. 4), the storage device 430 further stores insurance claim data 500, a claim handler data 460 (e.g., indicating a handlers workload, experience, special expertise, etc.), and segment rules 470. An example of a database that may be used in connection with the triage platform 400 will now be described in detail with respect to FIG. 5. Note that the database described herein is only one example, and additional and/or different information may be stored therein. Moreover, various databases might be split or combined in accordance with any of the embodiments described herein. For example, the claim handler data 460 and/or segment rules 470 might be combined and/or linked to each other within the triage engine application 414.

Referring to FIG. 5, a table is shown that represents the claim handler database 500 that may be stored at the triage platform 400 according to some embodiments. The table may include, for example, entries identifying insurance claims submitted under a particular long term disability insurance policy or a number of different policies. The table may also define fields 502, 504, 506, 508, 510 for each of the entries. The fields 502, 504, 506, 508, 510 may, according to some embodiments, specify: a claim identifier 502, a disability description 504, a date of birth 506, a determined segment 508, and an assigned claim handler identifier 510. The claim handler database 500 may be created and updated, for example, based on information electrically received and/or manually entered into the system by a team leader.

The claim identifier 502 may be, for example, a unique alphanumeric code identifying a claim submitted in connection with a long term disability insurance policy. The disability description 504 may indicate a diagnosis associated with the claim identifier 502 and the data of birth 506 may indicate when he or she was born. Although two claim characteristics 504, 506 are illustrated in FIG. 5 for clarity, note that an actual implementation may evaluate many other factors.

The determined segment 508 might be associated with an automatically determined level of complexity assessed by a triage platform. For example, claim "C_10001" was determined to be a segment one insurance claim because a pregnancy has a fairly predictable return to work recovery profile (and may therefore be assigned to a claim handler with a relatively heavy workload). The determined segment 508 may then be used by a team leader and/or the triage platform to establish an assigned claim handler identifier 510. For example, claim handler "H_101" might have a relatively heavy workload while claim handler "H_103" has a relatively light workload (and can therefore devote more time to each individual long term disability insurance claim).

By way of example, a team leader may enter key characteristic variables for a newly received long term disability insurance claim. Note that in the case of a long term disability claim, some or all of this information might be automatically populated based on corresponding data elements of a prior associated short term disability claim. Responsive to this entered information, the triage platform may provide a recommended claim segment based on the diagnosis, recovery profile, and/or the financial complexity of the claim. The triage platform may also output a diagnosis description pulled from the Official Disability Guidelines definition, and one or more recovery profiles. These factors may then be used by the team leader to an appropriate analyst resource. In addition, the recovery profile information may be used to help the team leader understand the appropriate next follow-up actions for the insurance claim as well as provide guidance that might need to be forwarded to the claim handler or analyst. According to some embodiments, a team leader might review and/or override a claim segment that was automatically determined by the triage platform.

Figure 6A:
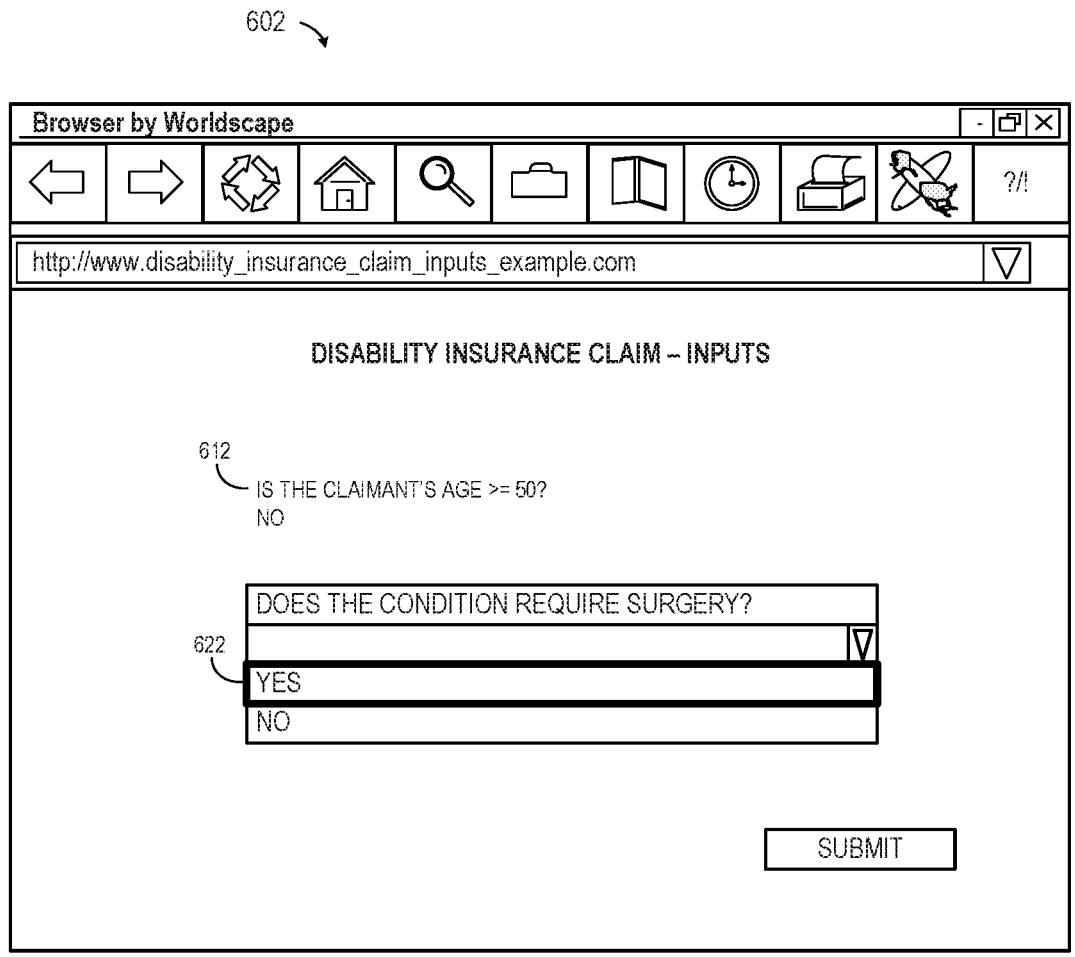
FIG. 6A illustrates a disability insurance claim system input in accordance with some embodiments.

FIG. 6A illustrates a disability insurance claim system input 602 in accordance with some embodiments. The input 602 may include, for example, text-based answers to questions 612 and/or selections from pull down menus 622 to provide information about claimants and/or claimant conditions. According to some embodiments, answers to some questions might result in one or more follow-up questions being automatically determined by the system and presented on the input 602. Information provided via the input 602 may, according to some embodiments, help determine an appropriate segment and/or claim handler for a disability claim.

Figure 6B:
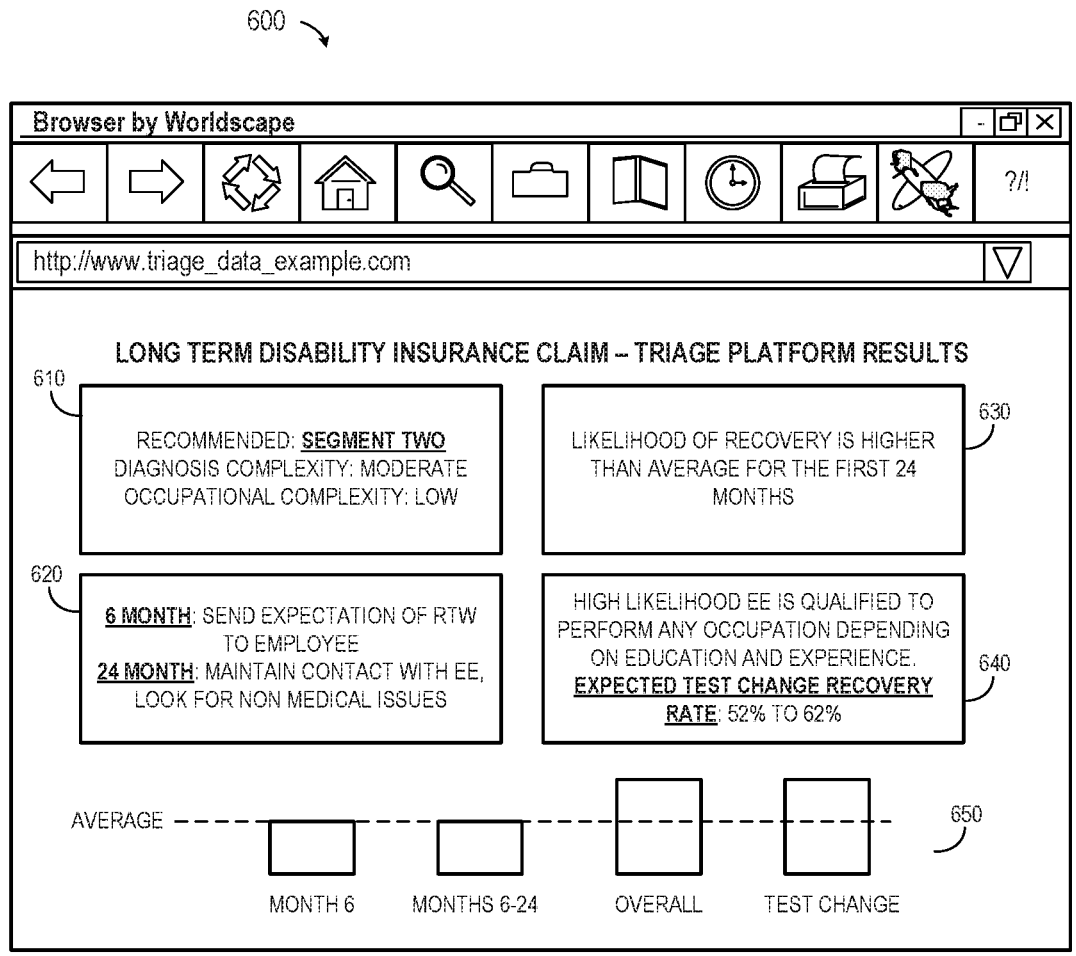
FIG. 6B illustrates a triage platform graphical user output in accordance with some embodiments.

FIG. 6B illustrates a triage platform graphical user output 600 that might be displayed to a team leader in accordance with some embodiments. The output 600 includes the recommended segment 610 (e.g., based on the determined segment 508 in the insurance claim database 500) along with the reasons why that particular segment was determined (e.g., based on the diagnosis, the recovery profile, and/or financial complexity of the claim). According to some embodiments, the output 600 further incudes a diagnosis description for the insurance claim. The diagnosis description might, for example, be pulled from the Official Disability Guidelines definitions.

The output 600 also includes 6 month and 24 month recovery recommendations 620 for the insurance claim. The predicted 24 month Return To Work ("RTW") recovery rate might be determined, for example, using the employee's particular medical condition and other factors entered by the team leader. Note that the recovery recommendations 620, as well as the other information provided on the output, may be generated by multiple predictive models (e.g., different models associated with different time periods may output suggested text).

In addition, the output 600 includes an overall recovery profile 630. For example, a behavioral health recovery rate might be determined based on the medical condition (e.g., clinical depression or bi-polar disorder), the elimination period, marriage status, benefit percentage, salary, and/or gender of the claimant.

The output 600 further includes information about occupational risks, test change outlooks, and other considerations 640 that may be relevant to a claim handler. The test change outlook might represent an overall likelihood that a claimant, who has reached a test change point, will pass a test change requirement meeting an "any occupation" definition of disability. The occupational risk information might be based on, for example, job class, claimant age, diagnosis and/or salary.

A graphical representation 650 of the recovery profiles and/or other data in comparison to an average long term disability claim may also be provided in the output 600. For example, the likelihood of the claimant recovering in 6 months in contrast with the baseline (or average) for claimants within the first 6 months might be displayed along with the likelihood of the claimant recovering in 6 to 24 months in contrast with the baseline (or average) for claimants within 6 to 24 months of when the claim was submitted.

Figure 7:
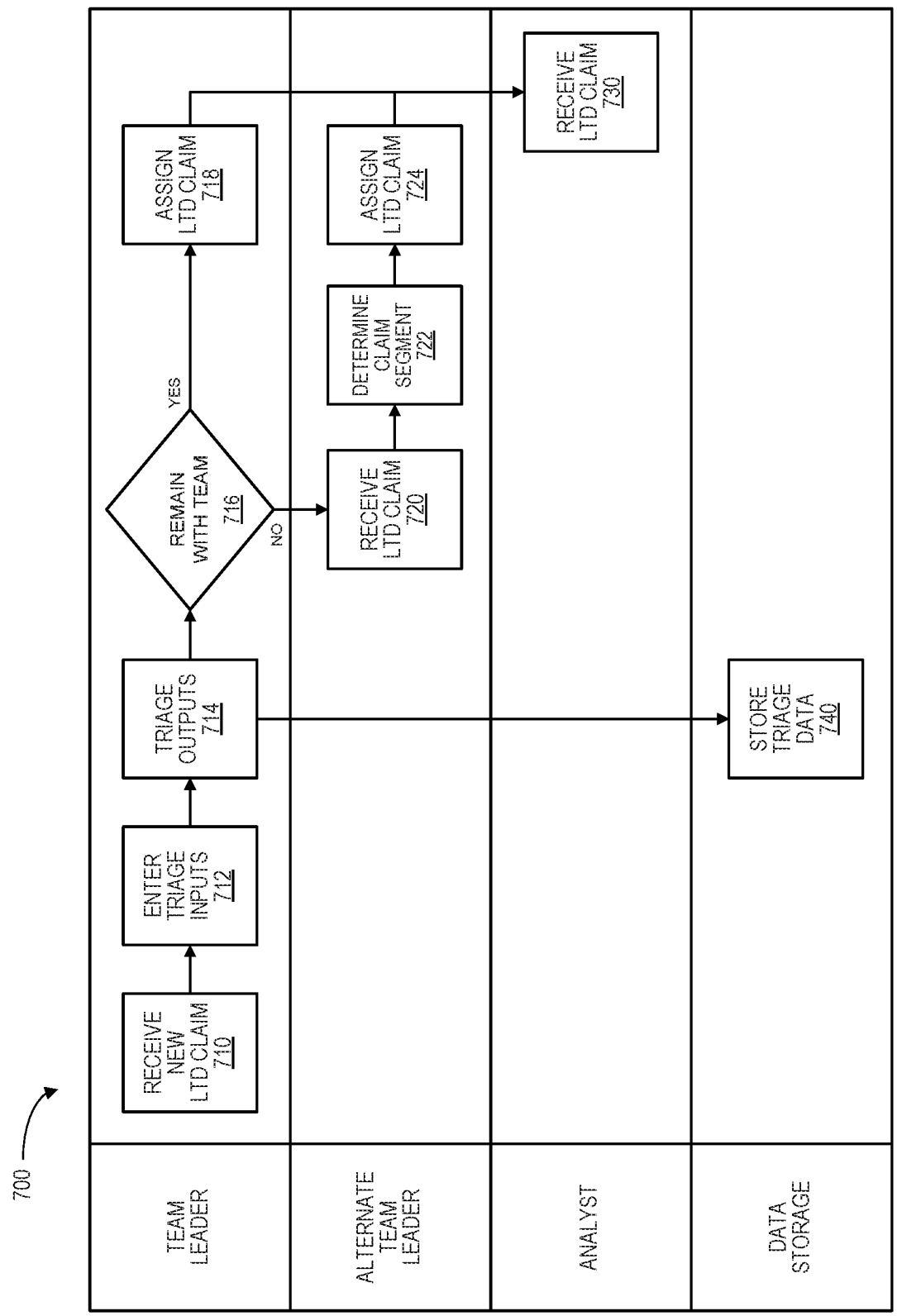
FIG. 7 is a long term disability insurance claim process flow in accordance with some embodiments.

FIG. 7 is a long term disability insurance claim process flow 700 in accordance with some embodiments. After a new long term disability insurance claim is received by a team leader at 710, information about the claim may be entered into a triage platform at 712. The triage outputs at 714 may be stored into data storage at 740 for later analysis and/or retrieval. The triage outputs at 714 are evaluated at 716 to determine if the insurance claim needs to be re-assigned to another team leader (e.g., because of special considerations regarding the claim or the leader). If the insurance claim does not need to be re-assigned, the leader assigns the claim at 718 and it is forwarded to an analyst at 730 for further processing. If the insurance claim needs to be re-assigned, it is received by the alternate team leader at 720, who may determine the claim segment at 722 and assign the long term disability claim at 724.

Thus, embodiments may provide group benefit claims with automated long term disability segmentation allowing improved claim, medical, and/or financial management of insurance claims. According to some embodiments, the application of specific claim variables, including diagnosis and other claim characteristics, as well insurer's historical claim recovery information may let claims be aligned within three segments based on claim management complexity. Note however, that two, four or more segments might be provided instead. An ability analyst and/or claim handler may be aligned by segment and receive claims best suited for his or her skill set, which may further result in improved claim management. That is, long term disability segmentation may result in optimized outcomes for long term disability insurance claims through better application of skilled resources to the right claims. The triage platform may assist team leaders with claim assessment (and claim assignment to an appropriate resource) by providing a recommended claim segment and assisting with the creation of an appropriate claim management plan.

According to some embodiments, a determination of an appropriate claim segment may be based at least in part on a predictive model trained with historical long term disability insurance claim information. For example, triage platform segmentation might be aided by data modeling, input from an insurer's claim subject matter experts, and analysis of historical claim experience. The following are some variables that might be used by a predictive model to help identify a correct claim segment for a long term disability claim:

Date of Birth (age, with older claimants perhaps requiring more time to return to work),
Date of Disability,
Waiting Period,
Diagnosis,
Salary,
Own Occupation Period (period of being disabled from claimant's own occupation as compared to any occupation),
And Job Type (e.g., Sedentary or Non-sedentary),
Spouse,
Benefit Percentage, and
Gender.

According to some embodiments, the predictive mode utilizes high level diagnosis groupings. For example, by analyzing an insurer's historical data for high level diagnostic groups (e.g., cancer, respiratory, musculoskeletal, circulatory, etc.), predictive models may be created for each group to identify the variables most likely to impact duration and claim outcomes. Factors that may contribute to the complexity of claim management, such as salary and definition of disability, might also be considered. Note that different diagnosis groupings may be associated with different sets and/or weights of relevant factors. For example, depending on the high level diagnosis grouping (e.g., cancer, respiratory illness), different variables may be significant and/or relevant and the weightings of common variables may be different.

In general, and for the purposes of introducing concepts of embodiments of the present invention, a computer system may incorporate a "predictive model." As used herein, the phrase "predictive model" might refer to, for example, any of a class of algorithms that are used to understand relative factors contributing to an outcome, estimate unknown outcomes, discover trends, and/or make other estimations based on a data set of factors collected across prior trials. Note that a predictive model might refer to, but is not limited to, methods such as ordinary least squares regression, logistic regression, decision trees, neural networks, generalized linear models, and/or Bayesian models. The predictive model is trained with historical claim transaction data, and is applied to current claim transactions to determine how the current claim transactions should be handled by a long term disability insurance program. Both the historical claim transaction data and data representing the current claim transactions might include, according to some embodiments, indeterminate data or information extracted therefrom. For example, such data/information may come from narrative and/or medical text notes associated with a claim file.

Figure 8:
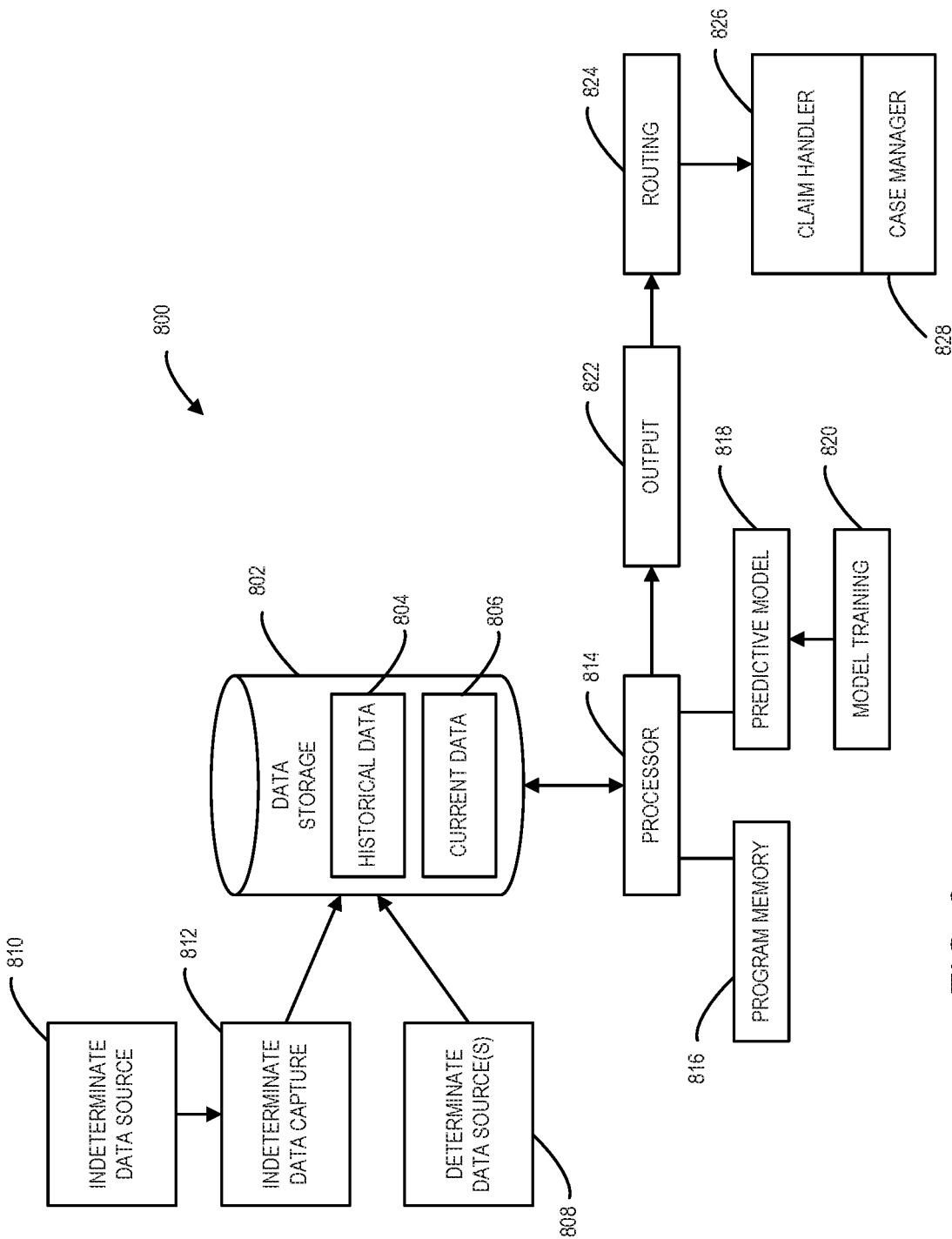
FIG. 8 is a partially functional block diagram that illustrates aspects of a computer system provided in accordance with some embodiments of the invention.

Features of some embodiments associated with a predictive model will now be described by first referring to FIG. 8. FIG. 8 is a partially functional block diagram that illustrates aspects of a computer system 800 provided in accordance with some embodiments of the invention. For present purposes it will be assumed that the computer system 800 is operated by an insurance company (not separately shown) for the purpose of referring certain claims to long term disability insurance claim handlers as appropriate.

The computer system 800 includes a data storage module 802. In terms of its hardware the data storage module 802 may be conventional, and may be composed, for example, by one or more magnetic hard disk drives. A function performed by the data storage module 802 in the computer system 800 is to receive, store and provide access to both historical claim transaction data (reference numeral 804) and current claim transaction data (reference numeral 806). As described in more detail below, the historical claim transaction data 804 is employed to train a predictive model to provide an output that indicates how a claim should by handled by a long term disability insurance program (e.g., segment assignments), and the current claim transaction data 806 is thereafter analyzed by the predictive model. Moreover, as time goes by, and results become known from processing current claim transactions, at least some of the current claim transactions may be used to perform further training of the predictive model. Consequently, the predictive model may thereby adapt itself to changing patterns of long term disability insurance claims.

Either the historical claim transaction data 804 or the current claim transaction data 806 might include, according to some embodiments, determinate and indeterminate data. As used herein and in the appended claims, "determinate data" refers to verifiable facts such as the date of birth, age or name of a claimant or name of another individual or of a business or other entity; a type of injury, accident, sickness, or pregnancy status; a medical diagnosis; a date of loss, or date of report of claim, or policy date or other date; a time of day; a day of the week; a vehicle identification number, a geographic location; and a policy number.

As used herein and in the appended claims, "indeterminate data" refers to data or other information that is not in a predetermined format and/or location in a data record or data form. Examples of indeterminate data include narrative speech or text, information in descriptive notes fields and signal characteristics in audible voice data files. Indeterminate data extracted from medical notes might be associated with, for example, a prior injury, alcohol related co-morbidity information, drug related co-morbidity information, tobacco related co-morbidity information, arthritis related co-morbidity information, diabetes related co-morbidity information, and/or obesity related co-morbidity information.

The determinate data may come from one or more determinate data sources 808 that are included in the computer system 800 and are coupled to the data storage module 802. The determinate data may include "hard" data like the claimant's name, date of birth, social security number, policy number, address; the date of loss; the date the claim was reported, etc. One possible source of the determinate data may be the insurance company's policy database (not separately indicated). Another possible source of determinate data may be from data entry by the insurance company's claims intake administrative personnel.

The indeterminate data may originate from one or more indeterminate data sources 810, and may be extracted from raw files or the like by one or more indeterminate data capture modules 812. Both the indeterminate data source(s) 810 and the indeterminate data capture module(s) 812 may be included in the computer system 800 and coupled directly or indirectly to the data storage module 802. Examples of the indeterminate data source(s) 810 may include data storage facilities for document images, for text files (e.g., claim handlers' notes) and digitized recorded voice files (e.g., claimants' oral statements, witness interviews, claim handlers' oral notes, etc.). Examples of the indeterminate data capture module(s) 812 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual. For example, claim handlers' opinions may be extracted from their narrative text file notes.

The computer system 800 also may include a computer processor 814. The computer processor 814 may include one or more conventional microprocessors and may operate to execute programmed instructions to provide functionality as described herein. Among other functions, the computer processor 814 may store and retrieve historical claim transaction data 804 and current claim transaction data 806 in and from the data storage module 802. Thus the computer processor 814 may be coupled to the data storage module 802.

The computer system 800 may further include a program memory 816 that is coupled to the computer processor 814. The program memory 816 may include one or more fixed storage devices, such as one or more hard disk drives, and one or more volatile storage devices, such as RAM (random access memory). The program memory 816 may be at least partially integrated with the data storage module 802. The program memory 816 may store one or more application programs, an operating system, device drivers, etc., all of which may contain program instruction steps for execution by the computer processor 814.

The computer system 800 further includes a predictive model component 818. In certain practical embodiments of the computer system 800, the predictive model component 818 may effectively be implemented via the computer processor 814, one or more application programs stored in the program memory 816, and data stored as a result of training operations based on the historical claim transaction data 804 (and possibly also data resulting from training with current claims that have been processed). In some embodiments, data arising from model training may be stored in the data storage module 802, or in a separate data store (not separately shown). A function of the predictive model component 818 may be to determine an appropriate complexity segment for current claim transactions. The predictive model component may be directly or indirectly coupled to the data storage module 802.

The predictive model component 818 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 800 includes a model training component 820. The model training component 820 may be coupled to the computer processor 814 (directly or indirectly) and may have the function of training the predictive model component 818 based on the historical claim transaction data 804. (As will be understood from previous discussion, the model training component 820 may further train the predictive model component 818 as further relevant claim transaction data becomes available.) The model training component 820 may be embodied at least in part by the computer processor 814 and one or more application programs stored in the program memory 816. Thus the training of the predictive model component 818 by the model training component 820 may occur in accordance with program instructions stored in the program memory 816 and executed by the computer processor 814.

In addition, the computer system 800 may include an output device 822. The output device 822 may be coupled to the computer processor 814. A function of the output device 822 may be to provide an output that is indicative of (as determined by the trained predictive model component 818) particular claim segments and/or claim handlers for the current claim transactions. The output may be generated by the computer processor 814 in accordance with program instructions stored in the program memory 816 and executed by the computer processor 814. More specifically, the output may be generated by the computer processor 814 in response to applying the data for the current claim transaction to the trained predictive model component 818. The output may, for example, be a true/false flag or a number within a predetermined range of numbers. In some embodiments, the output device may be implemented by a suitable program or program module executed by the computer processor 814 in response to operation of the predictive model component 818.

Still further, the computer system 800 may include a routing module 824. The routing module 824 may be implemented in some embodiments by a software module executed by the computer processor 814. The routing module 824 may have the function of directing workflow based on the output from the output device. Thus the routing module 824 may be coupled, at least functionally, to the output device 822. In some embodiments, for example, the routing module may direct workflow by referring, to a long term disability insurance program claim handler 826, current claim transactions analyzed by the predictive model component 818 and found to be associated with a particular claim segment. In particular, these current claim transactions may be referred to case manager 828 who is associated with the long term disability insurance program claim handler 826. The long term disability insurance program claim handler 826 may be a part of the insurance company that operates the computer system 800, and the case manager 828 might be an employee of the insurance company.

Figure 9:
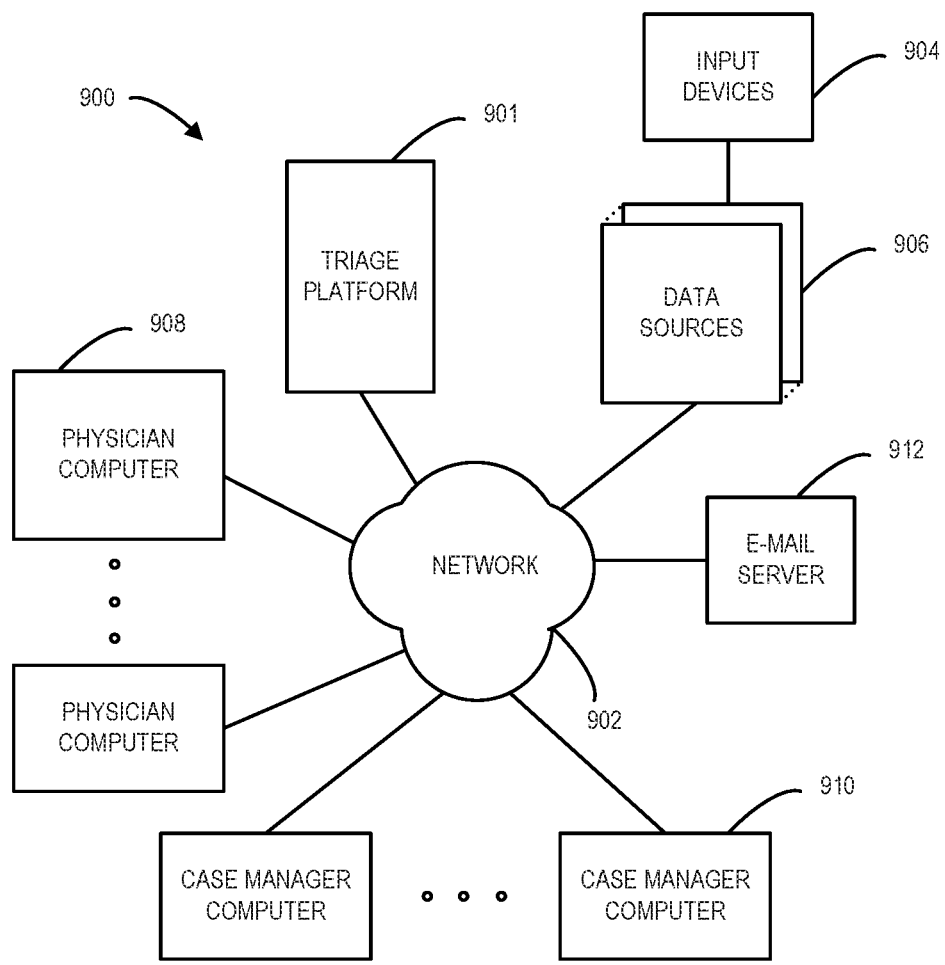
FIG. 9 is a block diagram that provides another representation of aspects of the system of FIG. 8.

FIG. 9 is another block diagram that presents a computer system 900 in a somewhat more expansive or comprehensive fashion (and/or in a more hardware-oriented fashion). The computer system 900, as depicted in FIG. 9, includes a "triage platform" 901 given that a function of the triage platform 901 is to automatically and selectively assess newly received long term disability insurance claims for the insurance company. As seen from FIG. 9, the computer system 900 may further include a conventional data communication network 902 to which the triage platform 901 is coupled.

FIG. 9 also shows, as parts of computer system 900, data input device(s) 904 and data source(s) 906, the latter (and possibly also the former) being coupled to the data communication network 902. The data input device(s) 904 and the data source(s) 906 may collectively include the devices 808, 810 and 812 discussed above with reference to FIG. 8. More generally, the data input device(s) 904 and the data source(s) 906 may encompass any and all devices conventionally used, or hereafter proposed for use, in gathering, inputting, receiving and/or storing information for insurance company claim files.

Still further, FIG. 9 shows, as parts of the computer system 900, personal computers 908 assigned for use by physicians (who may be associated with the insurance company's long term disability insurance program) and personal computers 910 assigned for use by case managers (who might also be associated with team leaders and/or claim handlers the long term disability insurance program). The personal computers 908, 910 are coupled to the data communication network 902.

Also included in the computer system 900, and coupled to the data communication network 902, is an electronic mail server computer 912. The electronic mail server computer 912 provides a capability for electronic mail messages to be exchanged among the other devices coupled to the data communication network 902. Thus the electronic mail server computer 912 may be part of an electronic mail system included in the computer system 900. The computer system 900 may also be considered to include further personal computers (not shown), including, e.g., computers which are assigned to individual claim handlers or other employees of the insurance company.

Figure 10:
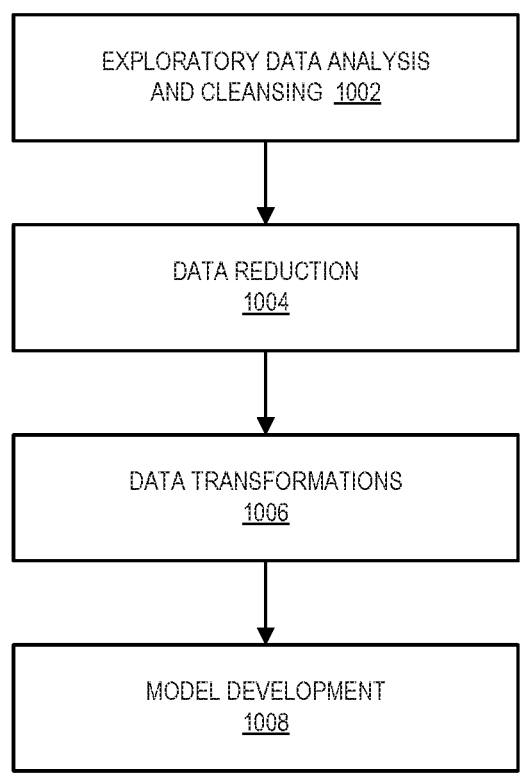
FIG. 10 is a flow chart illustrating how a predictive model might be trained according to some embodiments.

According to some embodiments, the triage platform 901 uses a predictive model to facilitate a provisioning of claim handlers. Note that the predictive model might be designed and/or trained in a number of different ways. For example, FIG. 10 is a flow chart illustrating how a predictive model might be created according to some embodiments. At 1002, data to be input to the predictive model may be analyzed, scrubbed, and/or cleaned. This process might involve a broad review of the relevant variables that may be included in the sample data. Variables might be examined for the presence of erroneous values, such as incorrect data types or values that don't make sense. Observations with such "noisy" data or missing data may be removed from the sample. Similarly, any data points that represent outliers are also managed.

At 1004, a data reduction process might be performed. This might occur, for example, between variables in the data sample and/or within specific variables. According to some embodiments, certain variables may be associated with one another and the number of these variables may be reduced. For example, it might be noted that injuries to the left shoulder generally have values similar to injuries to the right shoulder. Within certain variables, the raw values may represent a level of information that is too granular. These raw values might then be categorized to reduce the granularity. A goal of the data reduction process may be to reduce the dimensionality of the data by extracting factors or clusters that may account for the variability in the data.

At 1006, any necessary data transformations may be performed. Transformations of dependent and/or independent variables in statistical models can be useful for improving interpretability, model fit, and/or adherence to modeling assumptions. Some common methods may include normalizations of variables to reduce the potential effects of scale and dummy coding or other numeric transformations of character variables.

Once these steps are complete, the predictive model may be developed at 1008. Depending on the nature of the desired prediction, various modeling techniques may be utilized and compared. The list of independent variables may be narrowed down using statistical methods as well as business judgment. Lastly, the model coefficients and/or weights may be calculated and the model algorithm may be completed. For example, it might be determined that back injuries require a high degree of management (and thus, according to some embodiments, a back injury might be weighted more as compared to a shoulder injury and thus be more likely to end up in a segment associated with claim handlers with light workloads).

Figure 11:
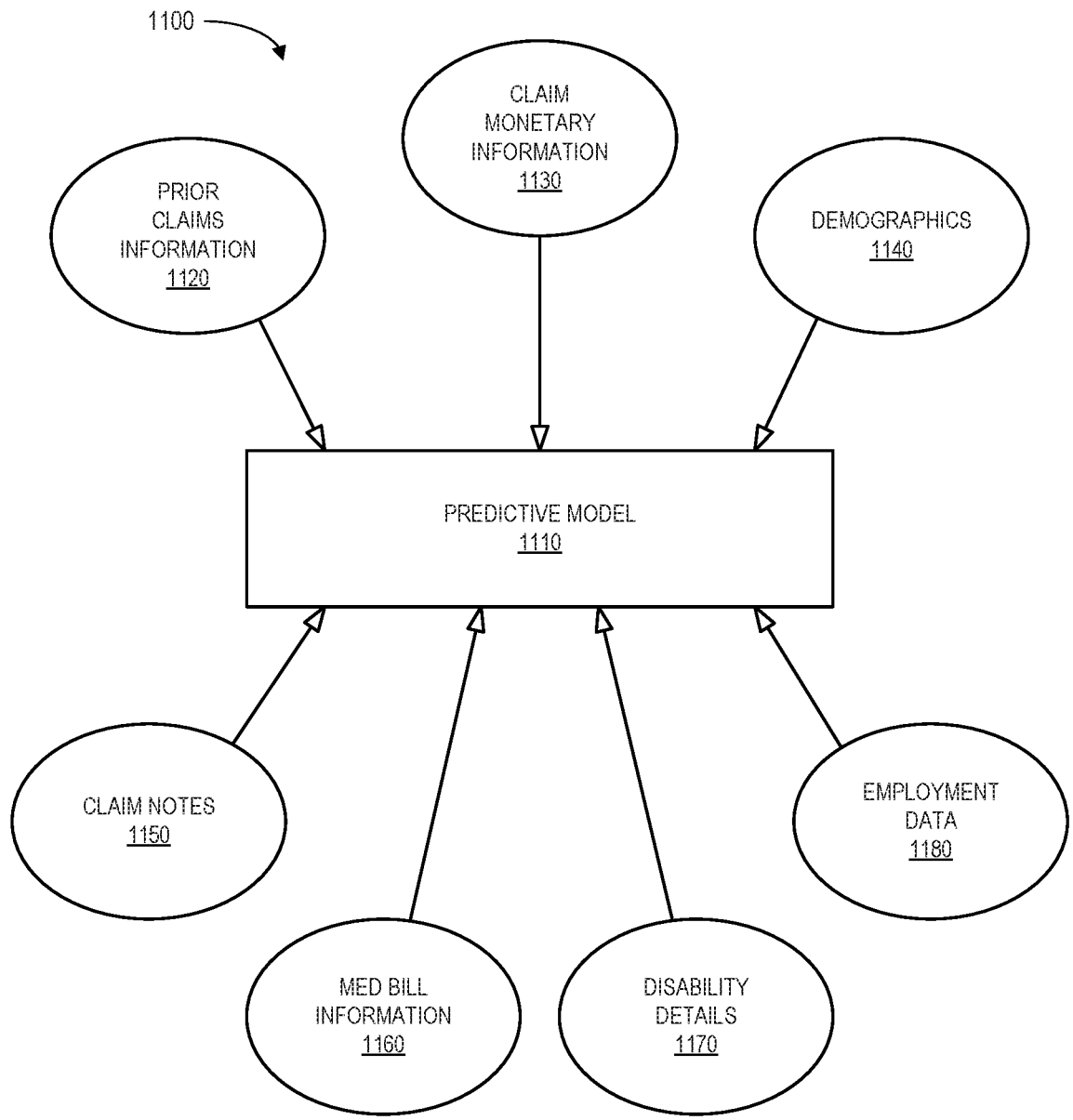
FIG. 11 illustrates predictive model inputs according to some embodiments.

Note that many different types of data might be used to create, evaluate, and/or use a predictive model. For example, FIG. 11 is a block diagram of a system 1100 illustrating inputs to a predictive model 1110 according to some embodiments. In this example, the predictive model 1110 might receive information about prior long term disability insurance claims 1120 (e.g., historical data). Moreover, the predictive model 1110 might receive monetary information about claims 1130 (e.g., a total amount of payments made in connection with a claim) and/or demographic information 1140 (e.g., the age or sex of a claimant). According to some embodiments, claim notes 1150 are input to the predictive model 1110 (e.g., and keywords may be extracted from the notes 1150). Other types of information that might be provided to the predictive model 1110 include medical bill information 1160 (e.g., including information about medical care that was provided to a claimant), disability details 1170 (e.g., which part or parts of the body have been injured), and employment data 1180 (e.g., an employee's salary or how long an employee has worked for an employer).

The predictive model 1110, in various implementation, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior data and outcomes known to the insurance company. The specific data and outcomes analyzed vary depending on the desired functionality of the particular predictive model 1110. The particular data parameters selected for analysis in the training process are determined by using regression analysis and/or other statistical techniques known in the art for identifying relevant variables in multivariable systems. The parameters can be selected from any of the structured data parameters stored in the present system, whether the parameters were input into the system originally in a structured format or whether they were extracted from previously unstructured text.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer system comprising:
(a) an indeterminate data capture module configured to extract historical indeterminate data from historical indeterminate data sources and current indeterminate data from current indeterminate data sources, wherein the indeterminate data comprises at least one of document images, claim handler notes, digitized recorded voice files, narrative speech or text, information in descriptive note fields, and signal characteristics of audible voice data files;
(b) an intake server configured to receive a plurality of current data sets corresponding to a plurality of claims, each of the plurality of current data sets including one or more of a field having a value indicative of diagnosis data, a field having a value indicative of recovery profile data, a field having a value indicative of complexity data, and a field indicative of recovery likelihood data;
(c) a segmentation platform interposed between the intake server and a plurality of remote user-accessible computers, comprising:
  (i) one or more data storage devices configured to store:
    (1) a plurality of historical data sets including a data table including at least a payment data field, a demographic data field, a medical code data field, an injury data field, and an employment data field, and
    (2) the plurality of current data sets, wherein the plurality of historical data sets and the plurality of current data sets stored by the one or more data storage devices include the historical indeterminate data and the current indeterminate data;
  (ii) a model training component computer processor configured to:
    receive at least some of the plurality of historical data sets from the one or more data storage devices;
    apply one or both of a variable association data reduction process and a granularity reduction process to the plurality of historical data sets to generate reduced historical data sets and reduce a dimensionality of the plurality of historical data sets; and
    train, based upon the reduced historical data sets, a predictive model to segment the plurality of current data sets, wherein the predictive model comprises one or more a neural network, a Bayesian network, an expert system, a decision tree, a collection of decision trees, and a support vector machine configured for processing involving large numbers of variables;
  (iii) the predictive model trained on the reduced historical data sets to segment the plurality of current data sets, wherein the predictive model being trained on the reduced historical data sets includes the predictive model being trained on the historical indeterminate data;
  (iv) a segment rules database configured to store segment rules to divide the plurality of claims into a plurality of segment classifications, at least one segment rule configured to:
    segment a data set to a higher complexity claim segment when the data set is indicative of at least two of the following conditions: the value indicative of the diagnosis data value is true, the value indicative of the recovery profile data is true, and the value indicative of the complexity data exceeds a pre-determined level; and
    segment a data set to a lower complexity claim segment when the data set is indicative of either: the value indicative of the recovery likelihood data is below a first pre-determined threshold value or the value indicative of the recovery likelihood data is above a second pre-determined threshold value; and
  (v) a triage processor configured to:
    (1) receive a current data set of the plurality of current data sets corresponding to a claim received by the intake server, the current data set including at least one of the field having the value indicative of the diagnosis data, the field having the value indicative of the recovery profile data, the field having the value indicative of the complexity data, and the field having the value indicative of the recovery likelihood data;
    (2) access the segment rules database to retrieve the at least one segment rule;
    (3) segment, based on application of the predictive model and the at least one segment rule to the current data set corresponding to the claim, the current data set to a claim segment, wherein the triage processor being configured to segment the current data set comprises the triage processor being configured to segment the current data set further based upon the current indeterminate data; and
    (4) automatically route, via the communication network, an electronic file corresponding to the current data set to the one of the plurality of remote user-accessible computers associated with a linked user identifier.

2. The computer system of claim 1,
wherein the triage processor is further configured to repeat steps (1)-(4) for additional ones of the plurality of current data sets and continuously adapt the predictive model by activating the model training component computer processor to update the predictive model with the additional ones of the plurality of current data sets and results corresponding to the additional current data sets.

3. The computer system of claim 1, wherein the one or more data storage devices of the segmentation platform is further configured to store: user data corresponding to a plurality of users, the user data including fields indicative of values of user identifier data, user workload data, user experience data, and user expertise data; and
wherein the triage processor is further configured to, before automatically routing the electronic file corresponding to the current data set to the one of the plurality of remote user-accessible computers:
dynamically determine updated user current workload data in the one or more data storage devices based upon continually received current workload data for each of the plurality of users; and
link the user identifier, corresponding to a user, to the current data set based upon the assigned claim segment and the user data including the dynamically determined updated current workload data for each of the plurality of users;
wherein the triage processor is configured to automatically route the electronic file to the one of the plurality of remote user-accessible computers associated with the linked user identifier responsive to linking of the user identifier to the claim.

4. The computer system of claim 3,
wherein the triage processor is further configured to repeat steps (1)-(4) for additional current data sets and continuously adapt the predictive model by activating the model training component computer processor to update the predictive model with the current data set and results corresponding to the additional current data sets.

5. The computer system of claim 1, wherein the triage processor is further configured to:
determine, based on application of the predictive model to the current data set, a recovery profile for the current data set; and
transmit via the communication network the recovery profile corresponding to the current data set to the one of the plurality of remote user-accessible computers associated with the linked user identifier.

6. The computer system of claim 1, wherein the intake server is further configured to receive data corresponding to a current data set by at least one of: a submitted paper claim and a telephone call center.

7. A computer-implemented method comprising:
(a) receiving, by an intake server, a plurality of current data sets including one or more of a field having a value indicative of diagnosis data, a field having a value indicative of recovery profile data, a field having a value indicative of complexity data, and a field having a value indicative of recovery likelihood data;
(b) storing, in one or more data storage devices: (1) a plurality of historical data sets including a data table including at least a payment data field, a demographic data field, a medical code data field, an injury data field, and an employment data field, and (2) the plurality of current data sets;
(c) extracting, by an indeterminate data capture module, historical indeterminate data from historical indeterminate data sources and current indeterminate data from current indeterminate data sources, wherein the indeterminate data comprises at least one of document images, claim handler notes, digitized recorded voice files, narrative speech or text, information in descriptive note fields, and signal characteristics of audible voice data files;
wherein storing the plurality of historical data sets and the plurality of current data sets in the one or more data storage devices includes storing the historical indeterminate data and the current indeterminate data;
(d) receiving, by a triage processor, a current data set of a plurality of current data sets corresponding to a claim received by the intake server, the current data set including one or more of the field having the value indicative of diagnosis data, the field having the value indicative of recovery profile data, the field having the value indicative of complexity data, and the field having the value indicative of recovery likelihood data;
(e) accessing, by the triage processor, a segment rules database of a segmentation platform interposed between the intake server and a plurality of remote user-accessible computers, the segment rules of the segment rules database operative to divide a plurality of claims into a plurality of segment classifications, at least one segment rule configured to:
segment a claim to a higher complexity claim segment when its corresponding data set is indicative of at least two of the following conditions: the value indicative of the diagnosis data is true, the value indicative of the recovery profile data is true, and the value indicative of complexity data exceeds a pre-determined level; and
segment a claim to a lower complexity claim segment when its corresponding data set is indicative of either: the value of the data indicative of the likelihood of recovery is below a first pre-determined threshold value or the data indicative of the value of the likelihood of recovery is above a second pre-determined threshold value;
to retrieve the at least one segment rule;
(f) training, by a model training component computer processor based upon the plurality of historical data sets, a predictive model to segment data sets by:
receiving at least some of the plurality of historical data sets from the one or more data storage devices;
applying one or both of a variable association data reduction process and a granularity reduction process to the plurality of historical data sets to generate reduced historical data sets and reduce a dimensionality of the plurality of historical data sets; and
training, based upon the reduced historical data sets, the predictive model to segment current data sets;
wherein the predictive model comprises one or more a neural network, a Bayesian network, an expert system, a decision tree, a collection of decision trees, and a support vector machine configured for processing involving large numbers of variables;
(g) segmenting, by the triage processor, based on application of the predictive model trained on the reduced historical data sets, the reduced historical data sets including a data table including at least a payment data field, a demographic data field, a medical code data field, an injury data field, and an employment data field, and the at least one segment rule to the current data set corresponding to the claim, the current data set to a claim segment;
wherein segmenting based upon application of the predictive model trained on the reduced historical data sets comprises segmenting based upon application of the predictive model trained on the historical indeterminate data; and
wherein segmenting the current data set by the triage processor comprises segmenting the current data set further based upon the current indeterminate data; and
(h) automatically routing, by the triage processor, via a communication network, an electronic file corresponding to the claim to the one of the plurality of remote user-accessible computers associated with a linked user identifier.

8. The computer-implemented method of claim 7,
further comprising repeating steps (a)-(h) for additional current data sets and continuously adapting the predictive model by activating the model training component computer processor to update the predictive model with the current data set and results corresponding to the additional current data sets.

9. The computer-implemented method of claim 7, wherein the one or more data storage devices of the segmentation platform is further configured to store: user data corresponding to a plurality of users, the user data including fields indicative of values of user identifier data, user workload data, user experience data, and user expertise data; and
further comprising:
dynamically determining, by the triage processor, updated user current workload data in the one or more data storage devices based upon continually received current workload data for each of the plurality of users; and linking a user identifier, corresponding to a user, by the triage processor, to the current data set based upon the assigned claim segment and the user data including the dynamically determined updated current workload data for each of the plurality of users;

wherein automatically routing the electronic file to the one of the plurality of remote user-accessible computers associated with the linked user identifier is responsive to linking of the user identifier to the claim.

10. The computer-implemented method of claim 9, further comprising repeating steps (a)-(h) for additional current data sets and continuously adapting the predictive model by activating the model training component computer processor to update the predictive model with the additional current data sets and results corresponding to the additional current data sets.

11. The computer-implemented method of claim 7, further comprising:

determining, by the triage processor based on application of the predictive model to the current data set, a recovery profile for the current data set; and transmitting, by the triage processor, the recovery profile corresponding to the current data set to the one of the plurality of remote user-accessible computers associated with the linked user identifier via the communication network.

12. The computer-implemented method of claim 7, further comprising receiving, by the intake server, data corresponding to a current data set by at least one of: a submitted paper claim and a telephone call center.

13. The computer system of claim 1, wherein the predictive model comprises a neural network.

14. A computer system comprising:

(a) an intake server configured to receive a plurality of current data sets corresponding to a plurality of claims, each of the plurality of current data sets including a field having a value indicative of diagnosis data, a field having a value indicative of recovery profile data, a field having a value indicative of complexity data, and a field indicative of recovery likelihood data;

(b) a segmentation platform interposed between the intake server and a plurality of remote user-accessible computers, comprising:

(i) one or more data storage devices configured to store:
(1) a plurality of historical data sets including a data table including at least a payment data field, a demographic data field, a medical code data field, an injury data field, and an employment data field, and
(2) the plurality of current data sets;

(ii) a model training component computer processor configured to train, based upon the plurality of historical data sets, a predictive model to segment data sets, wherein the predictive model comprises a neural network;

(iii) the predictive model trained on the plurality of historical data sets to segment the plurality of current data sets;

(iv) a segment rules database configured to store segment rules to divide the plurality of claims into a plurality of segment classifications, at least one segment rule configured to:

segment a data set to a higher complexity claim segment when the data set is indicative of at least two of the following conditions: the value indicative of the diagnosis data value is true, the value indicative of the recovery profile data is true, and the value indicative of the complexity data exceeds a pre-determined level; and segment a data set to a lower complexity claim segment when the data set is indicative of either: the value indicative of the recovery likelihood data is below a first pre-determined threshold value or the value indicative of the recovery likelihood data is above a second pre-determined threshold value; and (v) a triage processor configured to:

(1) receive a current data set of the plurality of current data sets corresponding to a claim received by the intake server, the current data set including the field having the value indicative of the diagnosis data, the field having the value indicative of the recovery profile data, the field having the value indicative of the complexity data, and the field having the value indicative of the recovery likelihood data;

(2) access the segment rules database to retrieve the at least one segment rule;

(3) segment, based on application of the predictive model and the at least one segment rule to the current data set corresponding to the claim, the current data set to a claim segment; and (4) automatically route, via the communication network, an electronic file corresponding to the current data set to the one of the plurality of remote user-accessible computers associated with a linked user identifier.

15. The computer system of claim 14, wherein the one or more data storage devices of the segmentation platform is further configured to store: user data corresponding to a plurality of users, the user data including fields indicative of values of user identifier data, user workload data, user experience data, and user expertise data; and wherein the triage processor is further configured to, before automatically routing the electronic file corresponding to the current data set to the one of the plurality of remote user-accessible computers:

dynamically determine updated user current workload data in the one or more data storage devices based upon continually received current workload data for each of the plurality of users; and link the user identifier, corresponding to a user, to the current data set based upon the assigned claim segment and the user data including the dynamically determined updated current workload data for each of the plurality of users;

wherein the triage processor is configured to automatically route the electronic file to the one of the plurality of remote user-accessible computers associated with the linked user identifier responsive to linking of the user identifier to the claim.

16. The computer system of claim 15, wherein the triage processor is further configured to repeat steps (1)-(4) for additional current data sets and continuously adapt the predictive model by activating the model training component computer processor to update the predictive model with the current data set and results corresponding to the additional current data sets.

* * * * *